United States Patent
Cardwell et al.

(10) Patent No.: US 9,638,094 B2
(45) Date of Patent: May 2, 2017

(54) CHARGE AIR COOLER WITH INTEGRATED ADJUSTABLE DRAIN MECHANISM

(71) Applicant: Halla Visteon Climate Control Corp., Daejeon (KR)

(72) Inventors: Brian James Cardwell, Ypsilanti, MI (US); Kastriot Shaska, Northville, MI (US); Orest Alexandru Dziubinschi, Dearborn, MI (US)

(73) Assignee: HANON SYSTEMS, Daejeon-si (KR)

( * ) Notice: Subject to any disclaimer, the term of this patent is extended or adjusted under 35 U.S.C. 154(b) by 388 days.

(21) Appl. No.: 14/246,312

(22) Filed: Apr. 7, 2014

(65) Prior Publication Data

US 2015/0285128 A1 Oct. 8, 2015

(51) Int. Cl.
  *F02B 29/04* (2006.01)
  *F28F 17/00* (2006.01)
  *F16K 15/02* (2006.01)

(52) U.S. Cl.
  CPC ........ *F02B 29/0468* (2013.01); *F28F 17/005* (2013.01); *F16K 15/028* (2013.01); *Y02T 10/146* (2013.01)

(58) Field of Classification Search
  CPC ............... F02B 29/0468; F16K 15/028; Y10T 137/0379; F28F 17/005
  USPC ..................................... 137/42, 41, 192, 202
  See application file for complete search history.

(56) References Cited

U.S. PATENT DOCUMENTS

| | | | | |
|---|---|---|---|---|
| 2,214,844 | A | * | 9/1940 | Van Keuren ............. F01P 11/20 137/62 |
| 2,777,303 | A | * | 1/1957 | Slattery ................... F24F 13/22 137/62 |
| 3,075,704 | A | * | 1/1963 | Stump ..................... F16K 24/00 137/62 |
| 5,115,798 | A | * | 5/1992 | Moore, Jr. .............. F24H 8/006 122/14.1 |
| 6,301,887 | B1 | * | 10/2001 | Gorel .................... F01N 3/0222 123/563 |
| 7,251,937 | B2 | * | 8/2007 | Appleton ............ F02B 29/0406 123/563 |
| 9,140,178 | B2 | * | 9/2015 | Pursifull ............. F02B 29/0468 |

(Continued)

FOREIGN PATENT DOCUMENTS

| | | | |
|---|---|---|---|
| CN | 102937043 A | 2/2013 | |
| GB | 814287 A * | 6/1959 | ........... F16K 15/028 |

(Continued)

*Primary Examiner* — Devon Russell
(74) *Attorney, Agent, or Firm* — Fraser Clemens Martin & Miller LLC; James D. Miller

(57) ABSTRACT

A charge air cooler comprises an outlet tank having a drain mechanism integrated in a wall thereof. The drain mechanism comprises a first valve head disposed to a first side of the wall, a first spring member disposed between the first valve head and the wall, a second valve head disposed to a second side of the wall, a second spring member disposed between the second valve head and the wall, and a valve stem coupled to each of the first valve head and the second valve head. The valve stem is reciprocatingly disposed within an aperture formed in the wall. The drain mechanism is configured to be in a closed position when an internal pressure within the outlet tank is at least one of greater than a first pressure value and lower than a second pressure value.

8 Claims, 3 Drawing Sheets

(56) References Cited

U.S. PATENT DOCUMENTS

| | | | | |
|---|---|---|---|---|
| 9,181,853 B2* | 11/2015 | Leone | ................ | F02B 29/0468 |
| 9,297,296 B2* | 3/2016 | Kuske | ................ | F02B 37/00 |
| 9,422,855 B2* | 8/2016 | Basile | ................ | F02B 29/0468 |
| 2007/0107425 A1 | 5/2007 | Appleton | | |
| 2007/0193629 A1* | 8/2007 | Huiging | ................ | F16K 15/028 |
| | | | | 137/493.7 |
| 2008/0302327 A1* | 12/2008 | Dahl | ................ | F02B 29/0468 |
| | | | | 123/184.53 |
| 2009/0114658 A1* | 5/2009 | Kumhyr | ................ | F16T 1/20 |
| | | | | 220/581 |
| 2012/0012192 A1* | 1/2012 | Guba | ................ | F16K 24/044 |
| | | | | 137/202 |
| 2012/0055151 A1* | 3/2012 | Durand | ................ | F01M 1/00 |
| | | | | 60/599 |
| 2015/0167539 A1* | 6/2015 | Basile | ................ | F02B 29/0468 |
| | | | | 60/599 |

FOREIGN PATENT DOCUMENTS

| | | |
|---|---|---|
| JP | 54-161812 U | 11/1979 |
| JP | 60-075638 U | 5/1985 |
| JP | 2010106883 A | 5/2010 |

\* cited by examiner

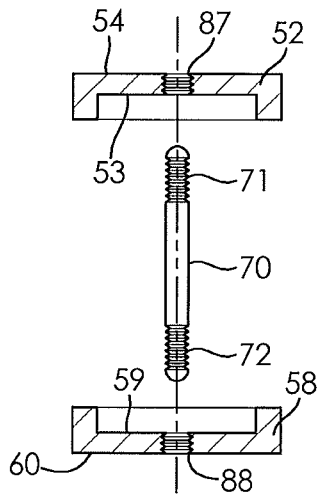
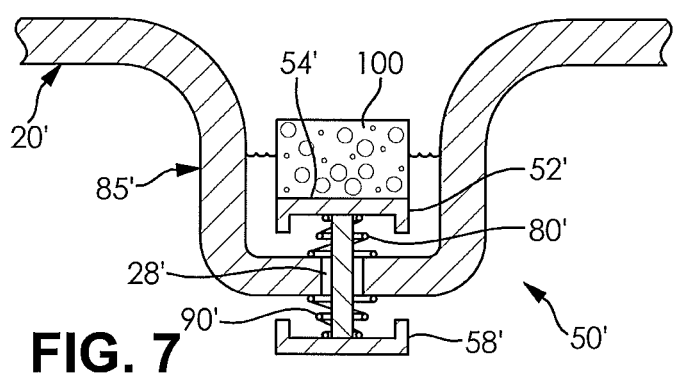
FIG. 6
FIG. 7
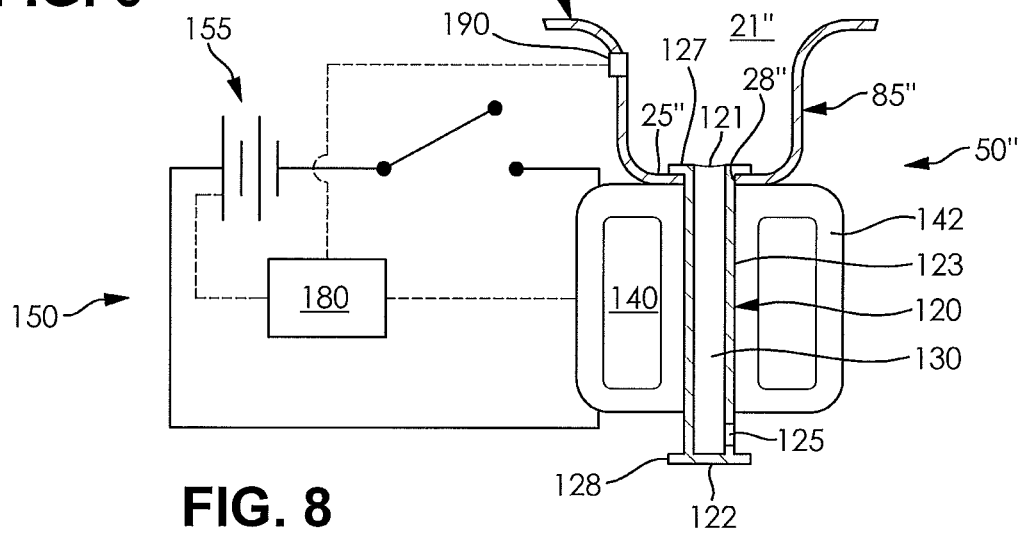
FIG. 8
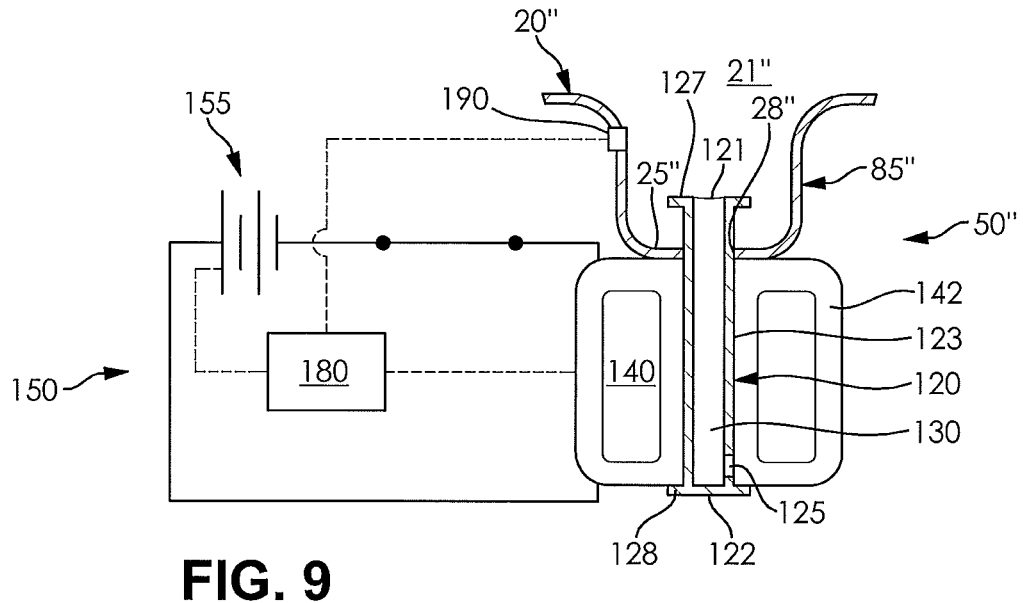
FIG. 9

CHARGE AIR COOLER WITH INTEGRATED ADJUSTABLE DRAIN MECHANISM

FIELD OF THE INVENTION

The invention relates to a charge air cooler, and more specifically to an adjustable valve used to drain water accumulation from an outlet tank of the charge air cooler.

BACKGROUND OF THE INVENTION

Charge air coolers, often also referred to as intercoolers, are used to cool a stream of air that has been compressed by a turbocharger. When the air is compressed by the turbocharger, the air is heated and the pressure of the air is increased. However, it is desirable for the air entering the engine to be cooled after exiting the turbocharger because cooler air will have an increased density that improves the efficiency of the engine. The cooling of the air may also eliminate the danger of pre-detonation of the air and a fuel prior to a timed spark ignition.

Most charge air coolers include an inlet tank that distributes the air stream through a plurality of heat exchange tubes. A second cooling fluid flows over the plurality of heat exchange tubes and removes heat from the air flowing therethrough. The charge air then exits the plurality of heat exchange tubes and enters an outlet tank. The outlet tank includes a fluid outlet through which the air stream exits the charge air cooler before entering an intake region of the engine.

One problem associated with the charge air cooler is that water vapor included within the air stream may be caused to condense within the plurality of heat exchanger tubes when a temperature of the air stream is reduced. The resulting condensation may then flow through the outlet tank and be drawn into cylinders of the engine. The liquid water entering the cylinders may result in engine mis-fire and combustion issues that degrade the engine's performance.

Some prior art solutions to the problem of condensate formation within the charge air cooler have relied on drainage systems that include additional components and added complexity. Such drainage systems may for instance require additional plumbing extending from the charge air cooler to another component of the motor vehicle and additional components for monitoring, altering, or controlling the flow of either the air or the liquid water through the drainage system. In addition to potentially adding cost and complexity to the system, such drainage systems are often only suitable for very specific motor vehicles having predetermined operating conditions. Accordingly, the components used to form such a drainage system may not be suitable for use in another motor vehicle having different operating conditions, such as a different range of internal air pressures within the charge air cooler.

Additionally, such drainage systems may only be configured to drain the liquid water under very limited circumstances, such as when an internal pressure within the charge air cooler is above a threshold value. However, under some circumstances, the pressure of the air within the charge air cooler can actually drop suddenly to a pressure below the atmospheric pressure, creating a near vacuum within the charge air cooler. Many of the prior art drainage systems are not configured for operation during these limited circumstances.

It would therefore be desirable to produce a drain mechanism having a simple construction that is integrated into the charge air cooler and adjustable to the operating conditions of the motor vehicle having the charge air cooler.

SUMMARY OF THE INVENTION

Compatible and attuned with the present invention, an adjustable drain mechanism integrated into an outlet tank of a charge air cooler has surprisingly been discovered.

In one embodiment of the invention, a drain mechanism integrated into a wall of an outlet tank of a charge air cooler is disclosed. The drain mechanism comprises a first valve head disposed on a first side of the wall and within a hollow interior of the outlet tank, a second valve head disposed on a second side of the wall and an exterior of the outlet tank, and a valve stem having a first end coupled to the first valve head and a second end coupled to the second valve head. The valve stem is reciprocatingly disposed within an aperture formed in the wall of the outlet tank. The aperture provides fluid communication between the hollow interior of the outlet tank and the exterior of the outlet tank.

In a second embodiment of the invention, a charge air cooler is disclosed comprising an outlet tank having a hollow interior disposed downstream of and in fluid communication with a heat exchanger core having a plurality of heat exchanger tubes formed therein and a drain mechanism integrated in a wall of the outlet tank. The drain mechanism comprises a first valve head disposed on a first side of the wall and within a hollow interior of the outlet tank, a first spring member disposed between the first valve head and the first side of the wall, a second valve head disposed on a second side of the wall and an exterior of the outlet tank, a second spring member disposed between the second valve head and the second side of the wall, and a valve stem having a first end coupled to the first valve head and a second end coupled to the second valve head. The valve stem is reciprocatingly disposed within an aperture formed in the wall of the outlet tank, the aperture providing fluid communication between the hollow interior of the outlet tank and the exterior of the outlet tank.

In yet another embodiment of the invention, a charge air cooler is disclosed comprising an outlet tank having a hollow interior disposed downstream of and in fluid communication with a heat exchanger core having a plurality of heat exchanger tubes formed therein and a drain mechanism integrated in a wall of the outlet tank. The drain mechanism comprises a core tube adapted to be reactionary to a magnetic field, the core tube reciprocatingly disposed in an aperture formed in the wall of the outlet tank, the core tube having a hollow interior, an inlet formed at a first end thereof in fluid communication with the hollow interior of the outlet tank, and a drain aperture formed at a second end thereof. An electromagnet is disposed within a casing surrounding at least a portion of the core tube. The drain aperture of the core tube is blocked by the casing when the electromagnet is electrically energized and the drain aperture is in fluid communication with an ambient environment when the electromagnet is not electrically energized.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which:

FIG. 6 is an exploded cross-sectional view illustrating an adjustable feature of the drain mechanism;

FIG. 7 is a fragmentary cross-sectional front elevational view of a drain mechanism in an open position according to another embodiment of the invention;

FIG. 8 is a fragmentary cross-sectional front elevational view of a drain mechanism in an open position according to another embodiment of the invention; and FIG. 9 is a fragmentary cross-sectional front elevational view of the drain mechanism illustrated in FIG. 8 in a closed position.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
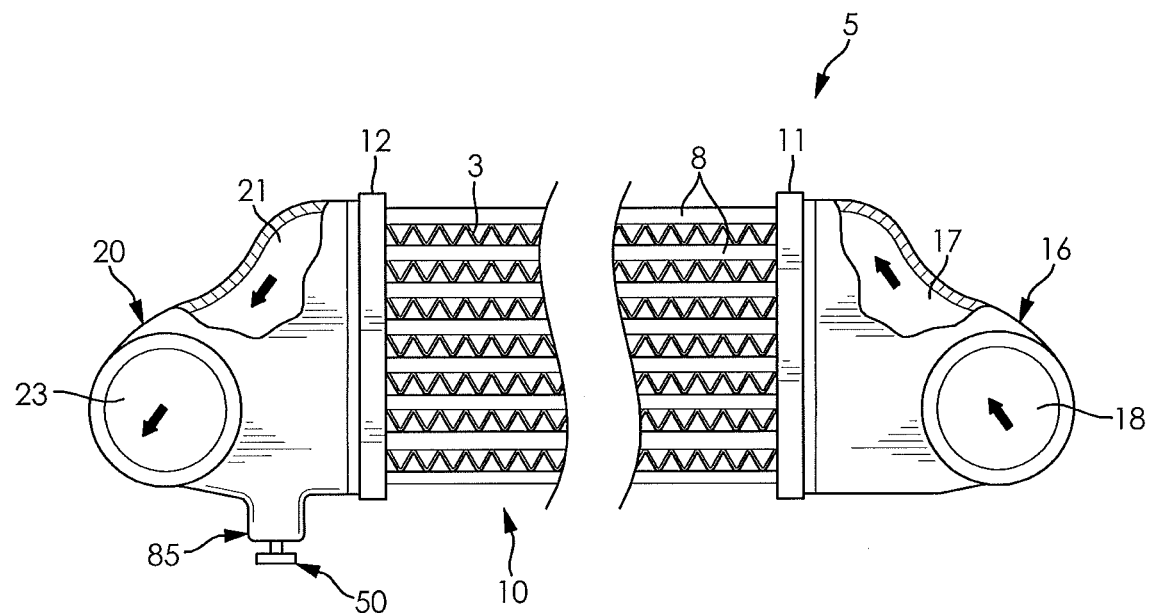
FIG. 1 is a fragmentary front elevational view of a charge air cooler having a drain mechanism integrated therein according to an embodiment of the invention, wherein a portion thereof is cut away.

FIG. 1 illustrates a charge air cooler 5 comprising a heat exchanger core 10 disposed between an inlet tank 16 and an outlet tank 20. The inlet tank 16 includes a hollow interior 17 and a fluid inlet 18 providing fluid communication between the hollow interior 17 of the inlet tank 16 and a turbocharger (not shown) disposed upstream of the inlet tank 16 and used to compress (and hence heat) intake air before the intake air enters the charge air cooler 5. The inlet tank 16 may include at least one fluid outlet (not shown) providing fluid communication between the hollow interior 17 of the inlet tank 16 and a first end plate 11 of the heat exchanger core 10. The first end plate 11 may include a plurality of passages (not shown) formed therein for distributing the charge air to a plurality of heat exchanger tubes 8. A seal or gasket (not shown) may be disposed between the first end plate 11 of the heat exchanger core 10 and the fluid outlet region of the inlet tank 16 to provide a fluid tight seal therebetween.

The plurality of heat exchanger tubes 8 extends from the first end plate 11 to a second end plate 12 disposed at an opposite end of the heat exchanger core 10. In similar fashion to the first end plate 11, the second end plate 12 may also include a plurality of passages (not shown) corresponding to the plurality of heat exchanger tubes 8 for recombining the charge air as it enters the outlet tank 20. The plurality of heat exchanger tubes 8 may be spaced apart to allow a second cooling fluid to flow therebetween. It should be understood that the second cooling fluid may be any fluid having a temperature lower than the intake air flowing through the plurality of heat exchanger tubes. The second cooling fluid may for instance be ambient air, recirculation air, water, or any other cooling fluid circulating through any system of an automobile having the charge air cooler 5. A plurality of corrugated fins 3 or other surface area increasing structures may be formed on an exterior surface of each of the plurality of heat exchanger tubes 8 to facilitate heat transfer between the charge air flowing through the plurality of heat exchanger tubes 8 and the second cooling fluid flowing between the plurality of heat exchanger tubes 8.

The outlet tank 20 may include at least one fluid inlet (not shown) formed therein providing fluid communication between the plurality of passages formed in the second end plate 12 of the heat exchanger core 10 and a hollow interior 21 of the outlet tank 20. A seal or gasket (not shown) may be disposed between the second end plate 12 of the heat exchanger core 10 and the fluid inlet of the outlet tank 20 to provide a fluid tight seal therebetween. The outlet tank 20 also includes at least one fluid outlet 23 formed therein providing fluid communication between the hollow interior 21 of the outlet tank 20 and an intake portion of an engine (not shown).

Figure 2:
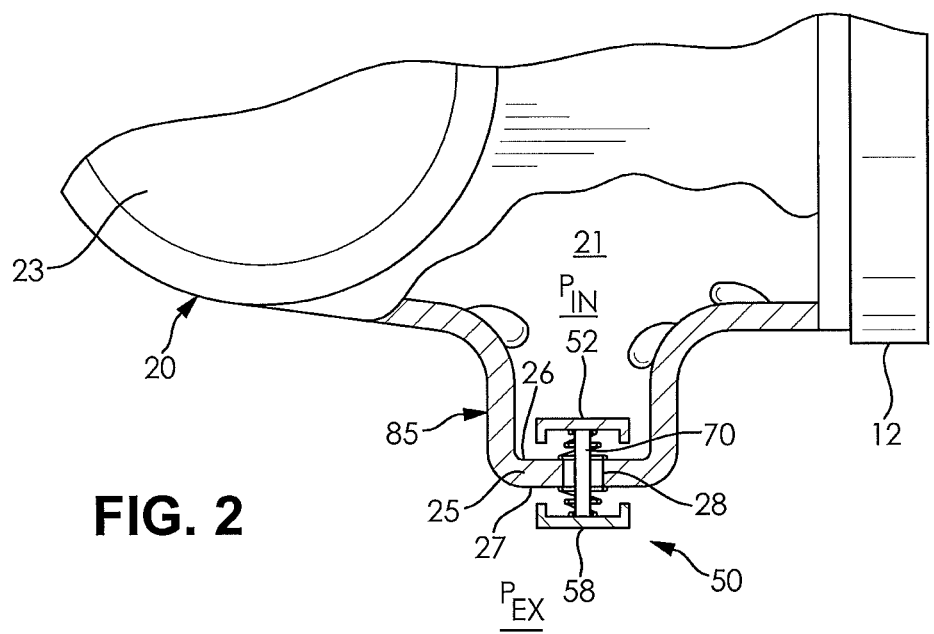
FIG. 2 is a fragmentary front elevational view of the charge air cooler illustrated in FIG. 1 with a portion thereof cut away to display the drain mechanism.

The outlet tank 20 also includes a drain mechanism 50 disposed in a lowermost region of the hollow interior 21 thereof with respect to gravity. In some embodiments, the drain mechanism 50 may be disposed in a fluid reservoir 85, as best shown in FIG. 2. The fluid reservoir 85 may be a depression or sump formed in the outlet tank 20 configured to collect liquid water therein. The drain mechanism 50 comprises a first valve head 52, a second valve head 58, and a valve stem 70.

The drain mechanism 50 spans a lower wall 25 of the outlet tank 20. As described hereinabove, the lower wall 25 may be a lowermost wall of the fluid reservoir 85 in some embodiments. The lower wall 25 has an interior surface 26 exposed to the hollow interior 21 of the outlet tank 20, an exterior surface 27 exposed to an ambient environment, and a drain aperture 28 extending from the interior surface 26 to the exterior surface 27 and providing fluid communication between the hollow interior 21 of the outlet tank 20 and the ambient environment. The first valve head 52 is disposed in the hollow interior 21 of the outlet tank 20 adjacent the interior surface 26 of the lower wall 25 while the second valve head 58 is disposed outside of the outlet tank 20 adjacent the exterior surface 27 of the outlet tank 20.

Figure 3:
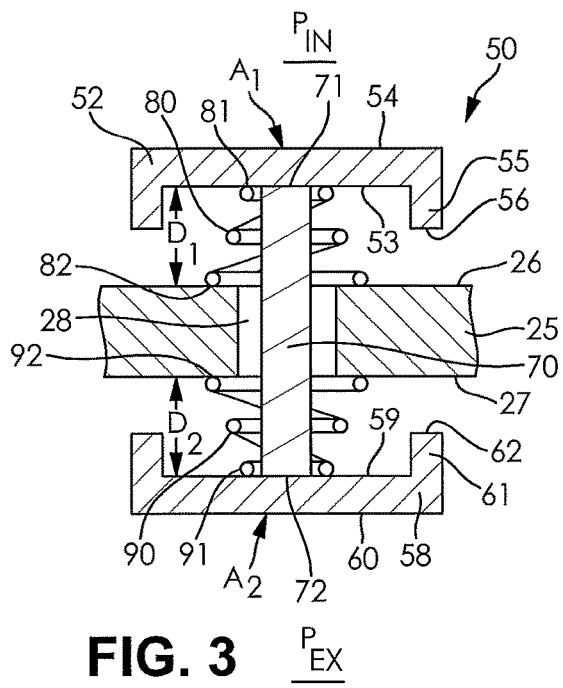
FIG. 3 is a fragmentary cross-sectional front elevational view of the drain mechanism illustrated in FIG. 2 in an open position.

Referring now to FIG. 3, the first valve head 52 includes an interior surface 53 facing the interior surface 26 of the lower wall 25 and an exterior surface 54 opposite thereto and facing away from the interior surface 26 of the lower wall 25. The exterior surface 54 of the first valve head 52 has a first surface area $A_1$. A first flange member 55 extends downward and away from the interior surface 53 of the first valve head 52 around a periphery thereof, giving the first valve head 52 a cap-like appearance. The lowermost surface of the first flange member 55 may form a first rim 56 in facing relationship with the interior surface 26 of the lower wall 25.

The first valve head 52 may be generally cylindrical in shape, including a circular interior surface 53, a circular exterior surface 54, and an annular first flange member 55. However, it should be understood that the first valve head 52 may have any shape while remaining within the scope of the current invention. For instance, each of the interior surface 53 and the exterior surface 54 of the first valve head 52 may be triangular, rectangular, or hexagonal, as desired, wherein the first flange member 55 would correspond to the peripheral shape of the interior and exterior surfaces 53, 54 of the first valve head 52.

The second valve head 58 includes an interior surface 59 facing the exterior surface 27 of the lower wall 25 and an exterior surface 60 opposite thereto and facing away from the exterior surface 27 of the lower wall 25. The exterior surface 60 of the second valve head 58 has a second surface area $A_2$. A second flange member 61 extends upward and away from the interior surface 59 of the second valve head 58 around a periphery thereof, also giving the second valve head 58 a cap-like appearance. An uppermost surface of the second flange member 61 may form a second rim 62 in facing relationship with the exterior surface 27 of the lower wall 25.

The second valve head 58 may be generally cylindrical in shape, including a circular interior surface 59, a circular exterior surface 60, and an annular second flange member 61. However, it should be understood that the second valve head 58 may have any shape while remaining within the scope of the current invention. For instance, each of the interior surface 59 and the exterior surface 60 of the second valve head 58 may be triangular, rectangular, or hexagonal, as desired, wherein the second flange member 61 would correspond to the peripheral shape of the interior and exterior surfaces 59, 60 of the second valve head 58.

The valve stem 70 includes a first end 71 coupled to the first valve head 52 and a second end 72 coupled to the second valve head 58. In some instances, the valve stem 70 may be releaseably coupled to at least one of the first valve head 52 and the second valve head 58. The valve stem 70 may be generally cylindrical in shape, but it should be understood that any geometry may be used while remaining within the scope of the current invention. The valve stem 70 extends through the drain aperture 28 formed in the lower wall 25, causing the valve stem 70 to extend from the hollow interior 21 of the outlet tank 20 to the ambient environment outside the exterior surface 27 of the lower wall 25. The valve stem 70 is dimensioned to allow for a clearance between the valve stem 70 and a surface forming the drain aperture 28 to allow liquid water to flow around the valve stem 70 and out of the outlet tank 20. In the case of a cylindrical valve stem 70, a space between the valve stem 70 and the aperture 28 may be annular in shape. The valve stem 70 may further include a guide feature (not shown) formed thereon to ensure that the valve stem 70 remains spaced from an interior surface of the aperture 28 to prevent blockage of liquid water exiting the outlet tank 20 or to maintain that the valve stem 70 remains reciprocatingly disposed within the aperture 28.

FIG. 3 shows the drain mechanism 50 when at rest and in an open position. A first spring member 80 is disposed between the first valve head 52 and the lower wall 25 while a second spring member 90 is disposed between the second valve head 58 and the lower wall 25. The first spring member 80 includes a first end 81 in contact with the interior surface 53 of the first valve head 52 and a second end 82 in contact with the interior surface 26 of the lower wall 25. In some embodiments, the first end 81 may be securely coupled to the interior surface 53 of the first valve head 52 while the second end 82 may be securely coupled to the interior surface 26 of the lower wall 25. The second spring member 90 includes a first end 91 in contact with the interior surface 59 of the second valve head 58 and a second end 92 in contact with the exterior surface 27 of the lower wall 25. In some embodiments, the first end 91 may be securely coupled to the interior surface 59 of the second valve head 58 and the second end 92 may be securely coupled to the exterior surface 27 of the lower wall 25. When at rest, the interior surface 53 of the first valve head 52 is spaced apart from the interior surface 26 of the lower wall 25 a distance $D_1$ while the interior surface 59 of the second valve head 58 is spaced apart from the exterior surface 27 of the lower wall 25 a distance $D_2$. The distance $D_1$ therefore represents a resting length of the first spring member 80 while the distance $D_2$ represents a resting length of the second spring member 90. The resting length of either the first spring member 80 or the second spring member 90 may be a length of each respective spring member 80, 90 when not subject to any displacement or a length where either of the spring members 80, 90 are not in motion. Accordingly, in some embodiments, one of the first spring member 80 and the second spring member 90 may be under a compressive force or a tensile force while at the resting length, depending on the characteristics of the drain mechanism 50 having the first and second spring members 80, 90.

The first spring member 80 has a first response to displacement $K_1$ and the second spring member 90 has a second response to displacement $K_2$. The first spring member 80 may be a linear spring, meaning that the first response to displacement $K_1$ represents a spring constant and a displacement of the first spring member 80 from its resting length $D_1$ is directly proportional to a force provided by the first spring member 80. Similarly, the second spring member 90 may also be a linear spring, meaning that the second response to displacement $K_2$ also represents a spring constant and a displacement of the second spring member 90 from its resting length $D_2$ is directly proportional to a force provided by the second spring member 90. Alternatively, the first spring member 80 may be a nonlinear spring, meaning that the first response to displacement $K_1$ is a function of the displacement of the first spring member 80 from its resting length $D_1$ and a force provided by the first spring member 80 is not directly proportional to the displacement of the first spring member 80. Similarly, the second spring member 90 may also be a nonlinear spring, meaning that the second response to displacement $K_2$ is also a function of the displacement of the second spring member 90 from its resting length $D_2$ and a force provided by the second spring member 90 is not directly proportional to the displacement of the second spring member 90. When either of the first spring member 80 and the second spring member 90 has a nonlinear response to displacement, the spring members 80, 90 may be conical-shaped nonlinear springs as depicted in FIGS. 2-5, for example.

The first spring member 80 may have a first response to displacement $K_1$ that causes the first spring member 80 to exert more force in response to being compressed a specified distance than does the second spring member 90 having the second response to displacement $K_2$ when compressed the same distance. Alternatively, the second spring member 90 may have a second response to displacement $K_2$ that causes the second spring member 90 to exert more force in response to being compressed a specified distance than does the first spring member 80 when compressed the same distance. Still, in other cases, the first spring member 80 and the second spring member 90 may exert equal forces in response to being compressed a specified distance.

In use, a turbocharged engine system having the charge air cooler 5 includes a turbocharger that compresses the air flowing therethrough, causing the pressure and the temperature of the air to be increased. The warm air flows from the turbocharger and into the hollow interior 17 of the inlet tank 16 via the fluid inlet 18. The warm air is then distributed to the plurality of heat exchanger tubes 8 forming the heat exchanger core 10 via the first end plate 11 of the heat exchanger core 10. The warm air flowing through the plurality of heat exchanger tubes 8 exchanges heat with the second cooling fluid flowing between the each of the plurality of heat exchanger tubes 8 to cool the warm compressed charge air originating from the turbocharger. As the air inside the plurality of heat exchanger tubes 8 is cooled, water vapor within the charge air may be caused to condense into liquid water. As the charge air flows through the plurality of exchanger tubes 8, the liquid water formed therein may propagate toward the hollow interior 21 of the outlet tank 20 via the second end plate 12 of the heat exchanger core 10.

The charge air exits the plurality of heat exchanger tubes 8 and flows through the hollow interior 21 of the outlet tank 20 until it exits the outlet tank 20 via the fluid outlet 23. The liquid water entering the outlet tank 20 is gravity fed toward the lower wall 25 of the outlet tank 20. As described hereinabove, the lower wall 25 may be formed in a fluid reservoir 85 used to retain the liquid water when the drain mechanism 50 is not in an open position.

When an engine of a motor vehicle having the charge air cooler 5 disposed therein is not in operation, a pressure $P_{IN}$ within the hollow interior 21 of the outlet tank 20 will be substantially equal to a pressure $P_{EX}$ of the ambient environment, which may be at atmospheric pressure. During operation of the engine of the motor vehicle, the pressure $P_{IN}$ within the hollow interior 21 of the outlet tank 20 will increase relative to the pressure $P_{EX}$ of the ambient environment due to the compression of the air in the turbocharger. In some limited circumstances, the engine may require more intake air than the turbocharger can provide for a limited period of time, primarily due to turbo lag within the turbo charged engine system. This may cause the pressure $P_{IN}$ within the hollow interior 21 of the outlet tank 20 to decrease rapidly relative to the pressure $P_{EX}$ of the ambient environment, as a vacuum may foam within the outlet tank 20. In such circumstances, the pressure $P_{IN}$ may drop to a value lower than a value of the pressure $P_{EX}$.

When the motor vehicle is not in operation, the relatively even pressures $P_{IN}$ and $P_{EX}$ cause the drain mechanism 50 to remain open because the lack of pressure difference between the exterior surface 54 of the first valve head 52 and the exterior surface 60 of the second valve head 58 allows the first spring member 80 and the second spring member 90 to remain at their respective resting positions. Any liquid water accumulated on the interior surface 26 of the lower wall 25 may then flow under the first rim 56 of the first valve head 52 and out of the outlet tank 20 via the aperture 28.

Figure 4:
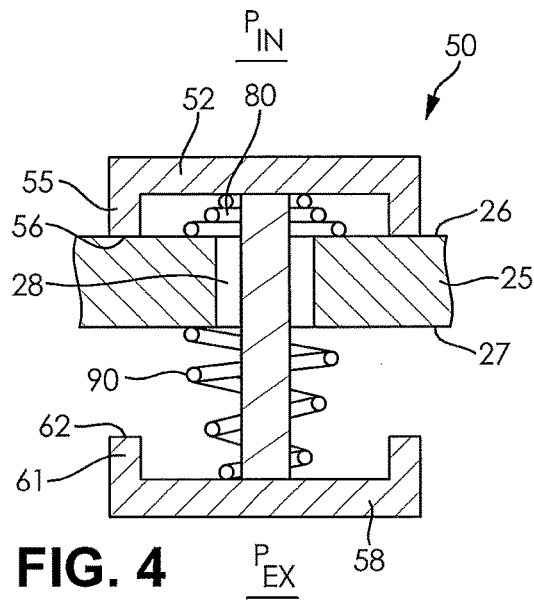
FIG. 4 is a fragmentary cross-sectional front elevational view of the drain mechanism illustrated in FIG. 2 in a first closed position.

When the motor vehicle is in operation, the pressure $P_{IN}$ within the outlet tank 20 increases relative to the pressure $P_{EX}$ of the ambient environment. Accordingly, a force applied to the first valve head 52 by the pressure $P_{IN}$ will also increase, while a force applied to the second valve head 58 by the pressure $P_{EX}$ will remain substantially the same, causing the force applied by the pressure $P_{IN}$ to urge the drain mechanism 50 downward and the first valve head 52 toward the interior surface 26 of the lower wall 25. As should be understood, the first spring member 80 will supply an upward force as the first spring member 80 is compressed and the second spring member 90 may also supply an upward force as the second spring member 90 is stretched, if the second spring member 90 is securely coupled to each of the wall 25 and the second valve head 58. As shown in FIG. 4, the first rim 56 will contact the interior surface 26 of the lower wall 25 and close the drain mechanism 50 when the downward force applied by the pressure $P_{IN}$ on the drain mechanism 50 overcomes the upward force applied by the pressure $P_{EX}$ as well as the upward force applied by the first and second spring members 80, 90 due to a displacement of the first and second spring members 80, 90 from their rest positions.

Figure 5:
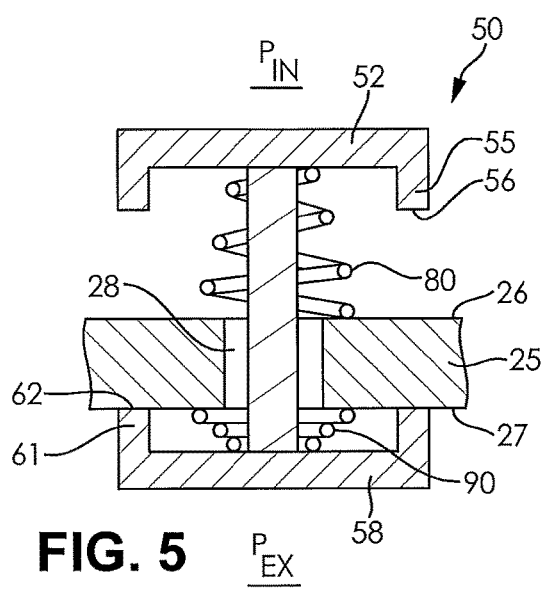
FIG. 5 is a fragmentary cross-sectional front elevational view of the drain mechanism illustrated in FIG. 2 in a second closed position.

When the motor vehicle is in operation and a temporary vacuum or low pressure is formed in the outlet tank 20, the pressure $P_{IN}$ within the outlet tank will decrease while the pressure $P_{EX}$ of the ambient environment will remain substantially the same. Accordingly, a force applied to the first valve head 52 by the pressure $P_{IN}$ will decrease relative to a force applied to the second valve head 58 by the pressure $P_{EX}$. If the pressure $P_{IN}$ lowers enough, the force applied by the pressure $P_{EX}$ will urge the drain mechanism 50 upward and the second rim 62 toward the exterior surface 27 of the lower wall 25. As should be understood, the second spring member 90 will supply a downward force to the drain mechanism 50 as the second spring member 90 is compressed and the first spring member 80 may also supply a downward force as the first spring member 80 is stretched, but only if the first spring member 80 is securely coupled to each of the wall 25 and the first valve head 52. As shown in FIG. 5, the second rim 62 will contact the exterior surface 27 of the lower wall 25 and close the drain mechanism 50 when the upward force applied by the pressure $P_{EX}$ on the drain mechanism 50 overcomes the downward force applied by the pressure $P_{IN}$ as well as the downward forces applied by the first and second spring members 80, 90 due to a displacement of the first and second spring members 80, 90 from their rest positions.

The drain mechanism 50 therefore remains closed during operation of the motor vehicle with the exception of a brief period of time when the pressures $P_{IN}$ and $P_{EX}$ are substantially the same when the pressure $P_{IN}$ drops due to the above described turbo lag. The drain mechanism 50 remaining closed during operation of the motor vehicle aids the performance of the engine as the drain mechanism 50 does not allow the charge air to be undesirably exhausted from the turbocharged engine system for extended periods of time during the draining of the liquid water.

The drain mechanism 50 is also advantageous as it may be adapted to be adjustable for use in a variety of different turbocharged engine systems facing varying internal and external conditions. As explained hereinabove, the exterior surface 54 of the first valve head 52 has a surface area $A_1$, the exterior surface 60 of the second valve head 58 has a surface area $A_2$, the first spring member 80 has a response to displacement $K_1$, the second spring member 90 has a response to displacement $K_2$, the first spring member 80 has a resting length $D_1$, and the second spring member 90 has a resting length $D_2$. A user of the drain mechanism 50 may easily alter these variables to adapt the drain mechanism 50 for use with different turbo charged engine systems having different internal conditions, including a different range of values of the pressure $P_{IN}$ during normal operation of the motor vehicle having the charge air cooler 5.

Because the pressure $P_{EX}$ is at atmospheric pressure, which remains largely constant relative to the variable pressure $P_{IN}$ of the interior of the outlet tank 20, the opening and closing of the drain mechanism 50 is dependent primarily on the value of the pressure $P_{IN}$. During operation of the motor vehicle, the drain mechanism 50 is in a closed position when the pressure $P_{IN}$ is above a first pressure value $P_1$. The drain mechanism 50 also closes when the pressure $P_{IN}$ is below a second pressure value $P_2$. The drain mechanism 50 will remain open only when the pressure $P_{IN}$ is between the pressure values $P_1$ and $P_2$.

By adjusting the variables discussed hereinabove, including $A_1$, $A_2$, $D_1$, $D_2$, $K_1$, and $K_2$, predetermined values for $P_1$ and $P_2$ may be selected by a user that are most suitable for the expected range of pressures of $P_{IN}$ experienced within the outlet tank 20 of the charge air cooler 5. The simple construction of the drain mechanism 50 allows for the components of the drain mechanism 50 to easily be adjusted or replaced in order to alter the values of $P_1$ and $P_2$. For instance, the first valve head 52 can be uncoupled from the valve stem 70 and replaced with a first valve head 52 having a different surface area $A_1$. The same process could also be performed to the second valve head 58. By changing the exposed surface areas $A_1$ and $A_2$, the amount of force applied to each respective valve head 52, 58 by the pressures $P_{IN}$ and $P_{EX}$ will also be changed, respectively. Alternatively, the first spring member 80 may be replaced with a first spring member 80 having a different resting length $D_1$ or a different response to displacement $K_1$. The same process may also be applied to the second spring member 90. Furthermore, the valve stem 70 may be removed and replaced with a valve stem 70 having a different length in addition to replacing the first and second spring members 80, 90 with first and second spring members 80, 90 having desired characteristics of $K_1$, $K_2$, $D_1$, and $D_2$, for example.

The releaseable coupling of the first valve head 52 and the second valve head 58 to the valve stem 70 may be accomplished by any means known in the art. For instance, at least one of the first valve head 52, the second valve head 58, and the valve stem 70 may include a threaded aperture formed therein adapted to mate with a threaded projection formed on at least one of the first valve head 52, the second valve head 58, and the valve stem 70. FIG. 6 illustrates a valve stem 70 having a threaded first end 71 and a threaded second end 72. The first valve head 52 includes a first threaded aperture 87 formed therein and the second valve head 58 includes a second threaded aperture 88 formed therein. The first threaded aperture 87 may extend only partially through the first valve head 52 or may extend through the first valve head 52 from the interior surface 53 thereof to the exterior surface 54 thereof. Similarly, the second threaded aperture 88 may extend partially or entirely through the second valve head 58 from the interior surface 59 thereof to the exterior surface 60 thereof. The first and second threaded ends 71, 72 of the valve stem 70 may accordingly be configured to mate with the first and second threaded apertures 87, 88 to releaseably couple the valve stem 70 to either of the first and second valve heads 52, 58. If the first and second threaded apertures 87, 88 are formed to extend through an entirety of the first and second valve heads 52, 58, respectively, the valve stem 70 can easily be adjusted to accommodate a wide variety of first and second spring members 80, 90 having uncompressed lengths of $D_1$ and $D_2$.

Alternatively, the valve stem 70 may be configured to make a snap-fit connection with at least one of the first valve head 52 and the second valve head 58. As a further example, the valve stem 70 may be formed to have an adjustable length to allow for a greater selection of the values $D_1$ and $D_2$.

As should be understood, the changing of the characteristics of the first valve head 52, the second valve head 58, the first spring member 80, and the second spring member 90 will also change the manner in which the drain mechanism 50 responds to changes in the pressure $P_{IN}$, allowing a user to customize the drain mechanism 50 to respond as desired when predetermined values of $P_1$ and $P_2$ are reached within the outlet tank 20.

FIG. 7 illustrates a drain mechanism 50' according to another embodiment of the invention. Structure similar to that illustrated in FIGS. 2-5 includes the same reference numeral and a prime (') symbol for clarity. The drain mechanism 50' is disposed within the fluid reservoir 85' formed in the lowermost region of the outlet tank 20'. The drain mechanism 50' differs from the drain mechanism 50 depicted in FIGS. 2-5 by including a float mechanism 100 coupled to the exterior surface 54' of the first valve head 52'. The float mechanism 100 is formed from a material having a density less than that of the water that may accumulate within the charge air cooler during use thereof. The fluid reservoir 85' should have a height sufficient to allow liquid water accumulating in the fluid reservoir 85' to rise to a level where the liquid water can come into contact with the float mechanism 100 before overflowing the fluid reservoir 85'.

The drain mechanism 50' may still include the same adjustable features as the drain mechanism 50. The drain mechanism 50' may include the first spring member 80' having a predetermined response to displacement and uncompressed length, the second spring member 90' having a predetermined response to displacement and uncompressed length, the first valve head 52' having a predetermined surface area, and the second valve head 58' having a predetermined surface area. However, the addition of the float mechanism 100 may affect a selection of these predetermined adjustable features due to an upward buoyancy force applied to the drain mechanism 50' by the float mechanism 100.

In use, liquid water is gravity fed toward and captured within the fluid reservoir 85' having the drain mechanism 50' disposed therein. The drain mechanism 50' operates in similar fashion to the drain mechanism 50, wherein the difference in pressure between $P_{IN}$ and $P_{EX}$ determines a position of the drain mechanism 50' based on the values of the variables $A_1$, $A_2$, $K_1$, $K_2$, $D_1$, and $D_2$.

However, the drain mechanism 50' differs from the drain mechanism 50 in that the float mechanism 100 provides a feature that ensures that the fluid reservoir 85' will not overflow and potentially cause a surge of liquid water exiting the outlet tank 20'. As a liquid water level of the fluid reservoir 85' increases during operation of the motor vehicle, the liquid water level may rise to the level of the float mechanism 100. As the water level continues to rise, more of the float mechanism 100 will be displaced by the water, causing an upward buoyancy force acting on the float mechanism 100 to also increase. The float mechanism 100 is accordingly selected to have a size and density such that a predetermined level of the liquid water within the fluid reservoir 85' will cause the upward buoyancy force acting on the float mechanism 100 to urge the drain mechanism 50' upward and into an open position, even while the motor vehicle is in operation and the pressure $P_{IN}$ is above the value $P_1$ within the outlet tank 20'. The liquid water then drains out of the fluid reservoir 85' via the aperture 28' formed in the lower wall 25' until the liquid water level is lowered, which reduces the upward buoyancy force acting on the float mechanism 100 and closes the drain mechanism 50'.

The drain mechanism 50' is also configured to close when the pressure $P_{IN}$ drops below the pressure value $P_2$ and to open when the pressure $P_{IN}$ is between the pressure values $P_1$ and $P_2$, assuming the water level in the fluid reservoir 85' has not reached the predetermined level. An additional advantage of the drain mechanism 50' having the float mechanism 100 is that liquid water that has accumulated in the fluid reservoir 85' can be drained from the outlet tank 20' without exhausting the charge air flowing therethrough during the brief period of time that the drain mechanism 50' remains in an open position if the pressure $P_{IN}$ suddenly drops from a value above $P_1$ to a value below $P_2$. This may occur because any liquid water accumulated in the fluid reservoir 85' will drain from the outlet tank 20' before any of the air flowing through the outlet tank 20' is exhausted therefrom.

FIGS. 8 and 9 illustrate a drain mechanism 50" according to another embodiment of the invention. Structure similar to that illustrated in FIGS. 2-5 includes the same reference numeral and a double prime (") symbol for clarity. The drain mechanism 50" may be disposed within the fluid reservoir 85" of the outlet tank 20" having the lower wall 25" formed therein. The lower wall 25" may include the aperture 28" formed therein for providing fluid communication between the hollow interior 21" of the outlet tank 20" and the ambient environment.

The drain mechanism 50" may include a core tube 120 reciprocatingly disposed within the aperture 28", where the core tube 120 acts as a valve stem of the drain mechanism 50". At least a portion of the core tube 120 may be formed from an electrically conductive material having magnetic properties, causing the core tube 120 to be adapted to be reactionary to a magnetic field. The core tube 120 has a hollow interior 130, an open first end 121 forming an inlet into the hollow interior 130 and providing fluid communication between the hollow interior 21" of the outlet tank 20" and the hollow interior 130 of the core tube 120, and a closed second end 122. The open first end 121 of the core tube 120 may include a first stopping means 127 coupled thereto acting as a first valve head of the core tube 120. The first stopping means 127 may be an annular flange surrounding the open first end 121 of the core tube 120. The closed second end 122 of the core tube 120 may include a second stopping means 128 coupled thereto acting as a second valve head of the core tube 120. The second stopping means 128 may be an annular flange surrounding the closed second end 122 of the core tube 120. At least one drain aperture 125 may be formed in a sidewall of the core tube 120 adjacent the closed second end 122 thereof. An exterior surface 123 of the core tube 120 is surrounded by an electromagnet such as a solenoid coil 140, where the solenoid coil 140 is disposed below the fluid reservoir 85". A non-conductive solenoid casing 142 may house the solenoid coil 140, where the solenoid casing 142 abuts the exterior surface 123 of the core tube 120. The solenoid coil 140 may be a component of an electrical circuit 150 having a power source 155, where the solenoid casing 142 includes ports (not shown) for connecting the solenoid coil 140 to the electrical circuit 150.

FIG. 8 shows the drain mechanism 50" in an open position. The core tube 120 is disposed at a lowermost position within the aperture 28" formed in the lower wall 25". The first stopping means 127 ensures that the core tube 120 cannot be moved any lower within the aperture 28". When in the open position, the drain aperture 125 is not covered by the solenoid casing 142, allowing for fluid communication between the hollow interior 130 of the core tube 120 and the ambient environment. The open first end 121 of the core tube 120 is also positioned to allow liquid water accumulated within the fluid reservoir 85" to drain into the hollow interior 130 of the core tube 120.

FIG. 9 shows the drain mechanism 50" when in a closed position. The core tube 120 is disposed at an uppermost position within the aperture 28" where the second stopping means 128 abuts a bottom of the solenoid casing 142. The drain aperture 125 is closed by an interior surface of the solenoid casing 142, preventing any liquid water within the hollow interior 130 of the core tube 120 from exiting the core tube 120. The second stopping means 128 may include a seal (not shown) disposed on an upper surface thereof for providing a fluid tight seal between the second stopping means 128 and the solenoid casing 142 when the drain mechanism 50" is in the closed position.

The drain mechanism 50" is normally in the open position when the motor vehicle having the charge air cooler 5 is not in operation. Any liquid water that has accumulated within the fluid reservoir 85" can accordingly drain therefrom through the drain aperture 125 formed in the core tube 120.

When the motor vehicle is in operation, the electrical circuit 150 is closed and the solenoid coil 140 is energized by the power source 155. The energizing of the solenoid coil 140 creates a magnetic field that urges the magnetic core tube 120 upward to place the drain mechanism 50" into the closed position. The drain aperture 125 is closed off by the solenoid casing 142, preventing any air or liquid water from exiting the core tube 120.

As described hereinabove, the drain mechanism 50" switches from the open position to the closed position when the motor vehicle is in operation and the electrical circuit 150 is energized by the power source 155, which could be a battery of the motor vehicle. However, the drain mechanism 50" may also be controlled by a controller 180 in electrical communication with the electrical circuit 150 and the drain mechanism 50". The controller 180 may be configured to open the drain mechanism 50" when certain sensors associated with the motor vehicle detect that an opening of the drain mechanism 50" during operation of the motor vehicle is preferable. For instance, the controller 180 may be in electrical communication with a water level sensor 190 disposed within the fluid reservoir 85". When the liquid water level within the fluid reservoir 85" reaches a predetermined level, the water level sensor 190 may detect the water level and send a signal to the controller 180 to discontinue energizing the solenoid coil 140. The core tube 120 would accordingly lower to the open position and drain liquid water from the fluid reservoir 85" until the controller 180 determines that the solenoid coil 140 should be re-energized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A drain mechanism disposed in a wall of an outlet tank of a charge air cooler, the drain mechanism comprising:
   a first valve head disposed on a first side of the wall and within a hollow interior of the outlet tank;
   a second valve head disposed on a second side of the wall and an exterior of the outlet tank; and
   a valve stem having a first end coupled to the first valve head and a second end coupled to the second valve head, wherein the valve stem is reciprocatingly disposed within an aperture formed in the wall of the outlet tank, the aperture providing selective fluid communication between the hollow interior of the outlet tank and the exterior of the outlet tank, wherein the valve stem is surrounded by an electromagnet configured to urge the valve stem in a direction toward the hollow interior of the outlet tank when the electromagnet is electrically energized, wherein the valve stem has a hollow interior including an inlet formed in the first end thereof providing fluid communication between the hollow interior of the outlet tank and the hollow interior of the valve stem and a drain aperture formed in a sidewall of the valve stem, the drain aperture selectively providing fluid communication between the hollow interior of the valve stem and the exterior of the outlet tank.

2. The drain mechanism according to claim 1, wherein the aperture is formed in a fluid reservoir formed in the wall of the outlet tank.

3. A charge air cooler comprising:
an outlet tank having a hollow interior disposed downstream of and in fluid communication with a heat exchanger core having a plurality of heat exchanger tubes formed therein;
a drain mechanism disposed in a wall of the outlet tank, the drain mechanism comprising:
a first valve head disposed on a first side of the wall and within a hollow interior of the outlet tank;
a first spring member disposed between the first valve head and the first side of the wall;
a second valve head disposed on a second side of the wall and an exterior of the outlet tank;
a second spring member disposed between the second valve head and the second side of the wall; and
a valve stem having a first end coupled to the first valve head and a second end coupled to the second valve head, wherein the valve stem is reciprocatingly disposed within an aperture formed in the wall of the outlet tank, the aperture providing fluid communication between the hollow interior of the outlet tank and the exterior of the outlet tank, wherein the drain mechanism is in an open position allowing fluid communication between the hollow interior of the outlet tank and the exterior of the outlet tank when a pressure within the hollow interior of the outlet tank is between a first pressure value and a second pressure value, wherein the drain mechanism is in a closed position and the first valve head abuts the first side of the wall of the outlet tank when the pressure within the hollow interior of the outlet tank is higher than the first pressure value, wherein the drain mechanism is in a closed position and the second valve head abuts the second side of the wall of the outlet tank when the pressure within the hollow interior of the outlet tank is lower than the second pressure value, and wherein the first pressure value is higher than the second pressure value.

4. The charge air cooler according to claim 3, wherein at least one of the first spring member and the second spring member has a non-linear relationship between a force exerted by the spring member and a change in length of the spring member.

5. The charge air cooler according to claim 3, wherein the first valve head has an exterior surface facing away from the wall having a first surface area and the second valve head has an exterior surface facing away from the wall having a second surface area; wherein the first surface area is different from the second surface area.

6. The charge air cooler according to claim 3, wherein the first valve head includes a float mechanism disposed thereon, the float mechanism having a density less than a density of liquid water.

7. A charge air cooler comprising:
an outlet tank having a hollow interior disposed downstream of and in fluid communication with a heat exchanger core having a plurality of heat exchanger tubes formed therein;
a drain mechanism disposed in a wall of the outlet tank, the drain mechanism comprising:
a core tube adapted to be reactionary to a magnetic field, the core tube reciprocatingly disposed in an aperture formed in the wall of the outlet tank, the core tube having a hollow interior, an inlet faulted at a first end thereof in fluid communication with the hollow interior of the outlet tank, and a drain aperture formed at a second end thereof;
an electromagnet disposed within a casing surrounding at least a portion of the core tube;
wherein the drain aperture of the core tube is blocked by the casing when the electromagnet is electrically energized and wherein the drain aperture is in fluid communication with an ambient environment when the electromagnet is not electrically energized.

8. The charge air cooler according to claim 7, further including a controller in electrical communication with the electromagnet, a power source configured to electrically energize the electromagnet, and a controller; wherein the controller is configured to not electrically energize the electromagnet when a predetermined water level is reached in the outlet tank.

* * * * *